United States Patent [19]
Yonke

[11] Patent Number: 5,996,238
[45] Date of Patent: Dec. 7, 1999

[54] RIGHT HAND LEVEL HOLDER

[76] Inventor: Bernard A. Yonke, 205 Prospect Ave., Pewaukee, Wis. 53072

[21] Appl. No.: 09/061,646

[22] Filed: Apr. 17, 1998

[51] Int. Cl.$^6$ ...................................................... G01C 9/28
[52] U.S. Cl. .................................. 33/371; 33/382; 33/407
[58] Field of Search .............................. 33/347, 370, 371, 33/379, 381, 382, 404, 407, 408

[56] References Cited

U.S. PATENT DOCUMENTS

| | | | |
|---|---|---|---|
| 1,683,065 | 9/1928 | Carpenter et al. | 33/382 |
| 2,466,829 | 4/1949 | Sprinkel | 33/382 |
| 2,615,253 | 10/1952 | Weathers | 33/408 |
| 2,906,031 | 9/1959 | Rice | 33/382 |
| 3,303,569 | 2/1967 | Wyatt | 33/382 |
| 4,501,057 | 2/1985 | Palomera | 33/371 |
| 4,531,301 | 7/1985 | Tau | 33/382 |
| 5,088,205 | 2/1992 | Egbert | 33/371 |
| 5,129,150 | 7/1992 | Sorensen | 33/408 |
| 5,408,752 | 4/1995 | Eadens | 33/407 |

FOREIGN PATENT DOCUMENTS 1563105  3/1969  France ...................................... 33/347

*Primary Examiner*—G. Bradley Bennett
*Attorney, Agent, or Firm*—Donald J. Ersler

[57] ABSTRACT

A right angle level holder includes a right angle level base, and a plurality of thumb screws. The right angle level base has two legs which are disposed 90 degrees apart from one another. Each leg has a slot which receives a straight level. A first side of the slot has an inverted acute angle surface which is structured to retain a first edge of a straight level. The second side of the slot has a raised portion which is high enough for tapping a threaded hole. The thumb screw is threaded in the threaded hole to retain a second edge of a straight level. The thumb screw has a first end which is adapted for turning by finger pressure. The second end of the thumb screw has a swivel tip that is adapted for retaining the second edge of a straight level.

10 Claims, 2 Drawing Sheets

RIGHT HAND LEVEL HOLDER

BACKGROUND OF THE INVENTION

1. Field of the Invention

The present invention relates generally to right angle levels and more specifically to a right angle level holder which retains two straight levels at a right angle to each other.

2. Discussion of the Prior Art

There are several level designs which address the need for a right hand level in the construction industry. An example of some of these right hand levels are U.S. Pat. No. 2,466,829 by Sprinkel, U.S. Pat. No. 3,303,569 by Wyatt, and U.S. Pat. No. 4,531,301 by Tau. The length of these levels are long enough to give an accurate reading for erecting walls and the like. However, the field of art lacks a device which is adapted to receive two straight levels and constrain them at a right angle to each other.

Accordingly, there is a clearly felt need in the art for a right hand level holder which is adapted to hold two straight levels at a 90 degree angle to each and thus allow a user to utilize existing straight levels which they already own.

SUMMARY OF THE INVENTION

The primary objective of the present invention is to provide a right hand level holder which is adapted to hold two straight levels at a 90 degree angle to each and thus allow an user to utilize existing straight levels which they already own.

According to the present invention, a right hand level holder includes a right angle level base, and a plurality of thumb screws. The right angle level base has two legs which are angularly disposed 90 degrees apart from one another. Each leg has a slot which receives a straight level. A first side of the slot has an inverted angle surface which is structured to retain a first edge of a straight level. The second side of the slot has a raised portion which has a height sufficient for tapping a threaded hole. The thumb screw is threaded into the hole to retain a second edge of a straight level. The thumb screw has a first end which is adapted for turning by finger pressure. The second end of the thumb screw has a swivel tip that is adapted for retaining the second edge of a straight level.

Accordingly, it is an object of the present invention to provide a right angle level holder which is adapted to retain two straight levels at a right angle to each other.

It is a further object of the present invention to provide provide a right angle level holder which allows a user to combine existing straight levels for use as a right angle level.

Finally, it is another object of the present invention to provide a right angle level holder which spares a user the cost of purchasing a separate right angle level.

These and additional objects, advantages, features and benefits of the present invention will become apparent from the following specification.

DETAILED DESCRIPTION OF THE PREFERRED EMBODIMENTS

Figure 1:
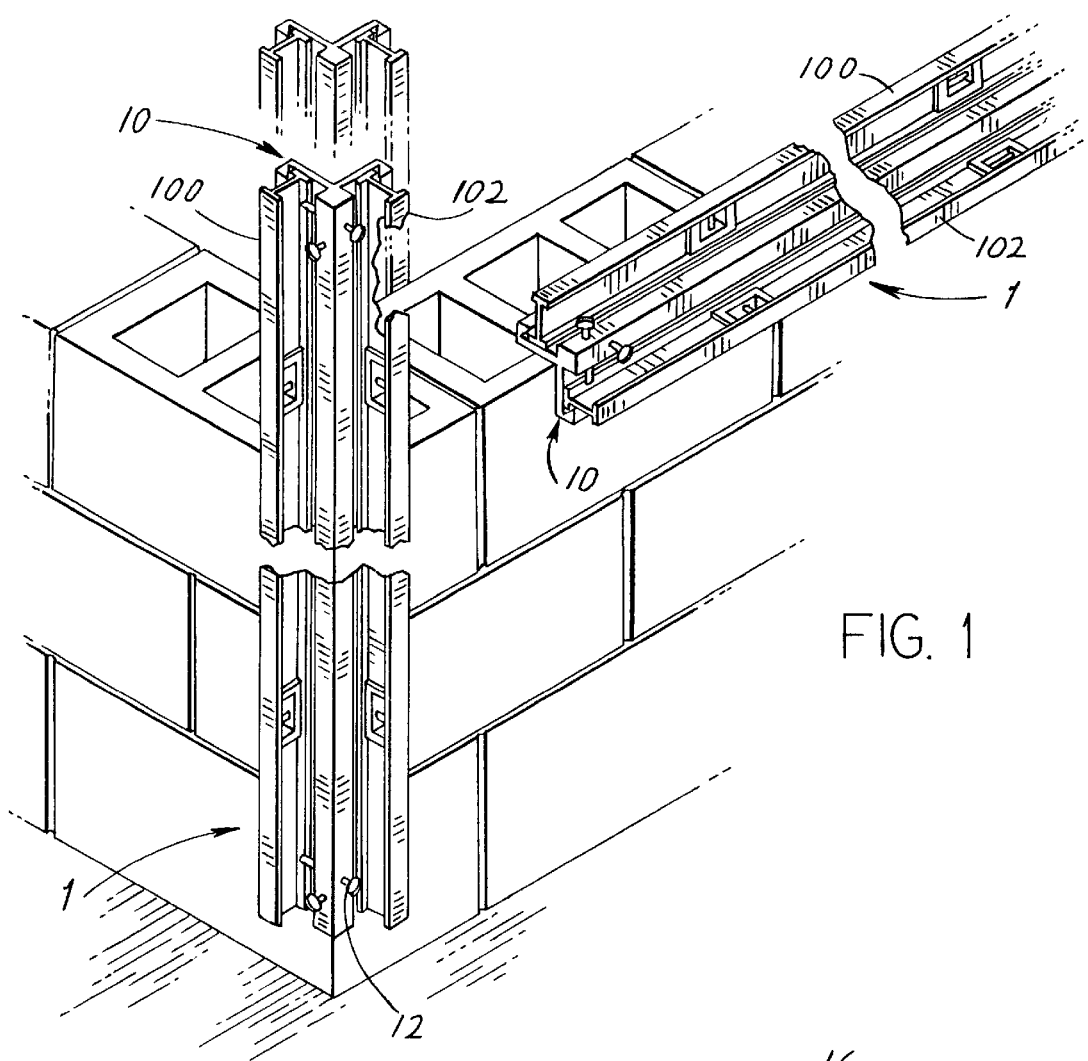
FIG. 1 is a perspective view of a right angle level holder being used in vertical and horizontal directions in accordance with the present invention.
Figure 2:
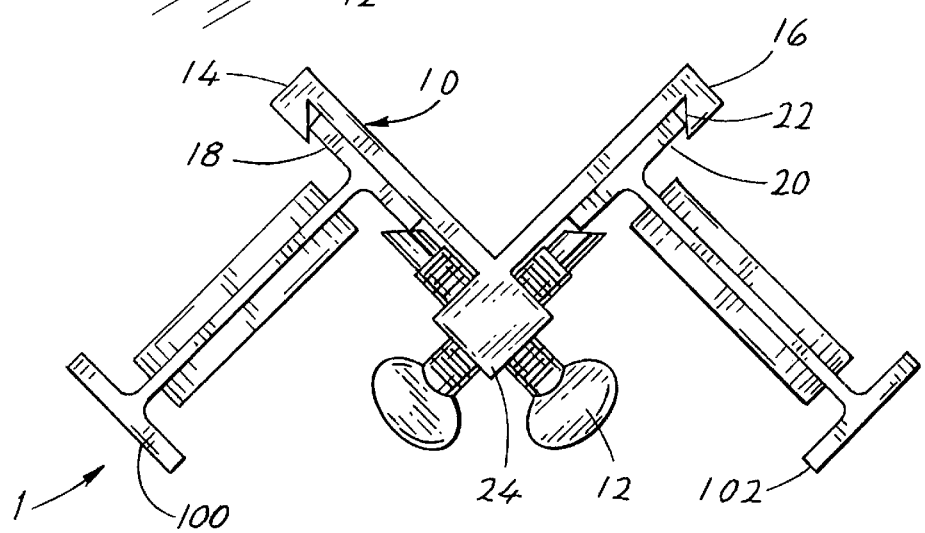
FIG. 2 is an end view of a right angle level holder in accordance with the present invention.

With reference now to the drawings, and particularly to FIG. 1, there is shown two perspective views of a right angle level holder 1 disposed on a cement block wall. With reference to FIG. 2, the right angle level holder 1 includes a right angle level base 10, and a plurality of thumb screws 12. The right angle level base 10 has a first leg 14 and a second leg 16 which are at a right angle to one another. The length of the right angle level base 10 is preferably two, four, six, or eight feet to support the full length of a standard sized straight level. The length of right angle base 10 may also be shorter than the full length of the straight level. The first leg 14 has a first slot 18 disposed on an outside surface of the right angle level base 10 and the second leg 16 has a second slot 20 disposed on an outside surface of the right angle level base 10 perpendicular to the first slot 18. Each slot is adapted to receive a bottom of a straight level. Each slot has a first side which is shaped as an acute angle 22 such that it retains a first edge of the bottom of the straight level. The value of the acute angle 22 is preferably 45 degrees. A second side of each slot has a raised portion 24 which has a height that is sufficient to form threads, or a cavity to facilitate attachment of a thumb screw or fastener means.

Figure 5:
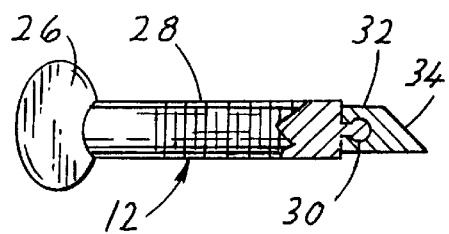
FIG. 5 is a cross-sectional view of a preferred embodiment of a thumb screw in accordance with the present invention.

The thumb screw 12 shown is a preferable method for retaining the first and second straight levels in the right angle level base 10, other types of fastener devices may also be used. With reference to FIG. 5, the thumb screw 12 includes a substantially threaded body 28 and a swivel tip 32. A thumb lever 26 is disposed at a first end of the substantially threaded body 28 and a swivel knob 30 is disposed at a second end of the threaded body 28. The thumb lever 26 is designed for allowing the thumb screw 12 to be rotated against a straight level by finger pressure. The swivel tip 32 has a slanted end 34 which is structured to retain the second edge of the straight level. The angle of the slanted end 34 is preferably 45 degrees. The swivel tip 32 is attached to the swivel knob 32 by any prior art swaging method. When the thumb screw 12 is rotated, the swivel tip 32 is prevented from rotation with a finger such that it fits over the second edge of the straight level. It is preferable that a thumb screw 12 be disposed at one foot intervals along the length of the right angle level base 10.

Figure 3:
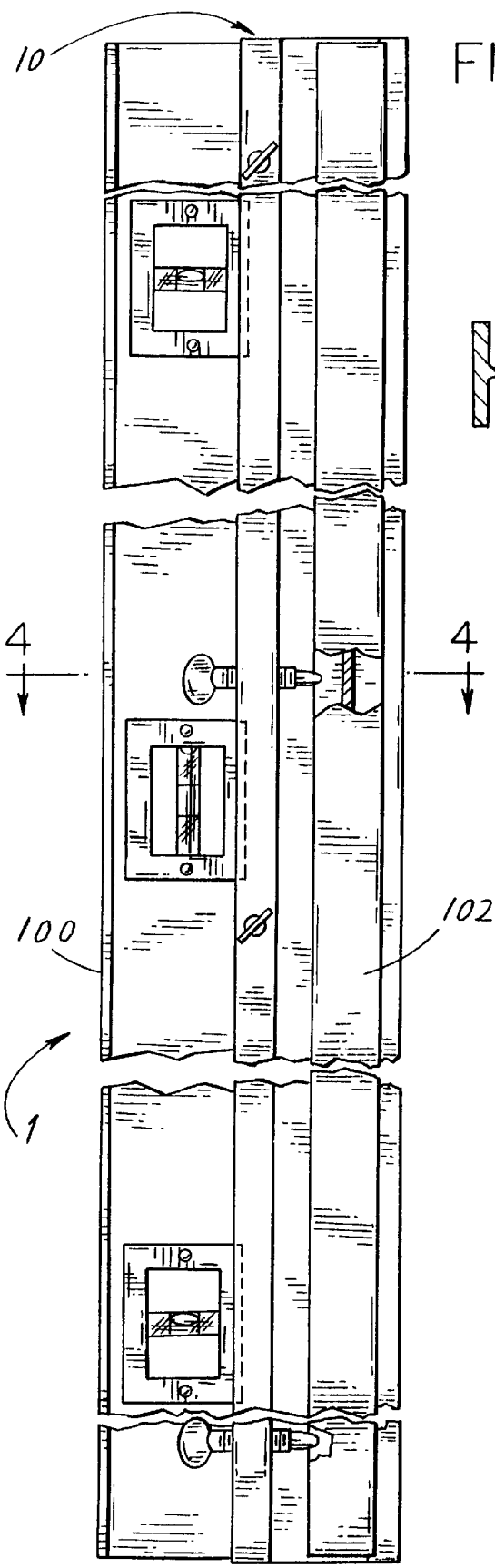
FIG. 3 is a front view of a right angle level holder retaining two straight levels in accordance with the present invention.
Figure 4:
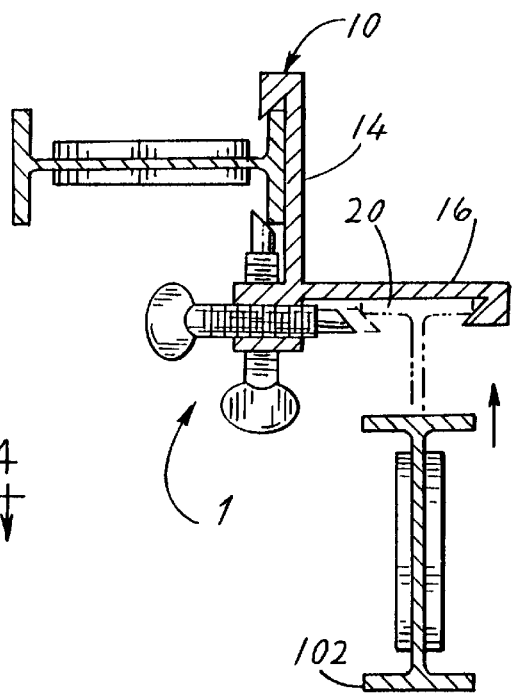
FIG. 4 is a cross-sectional view of a right angle level holder in accordance with the present invention.

FIG. 4 shows how the second straight level 102 may be inserted into a second slot 20 of the second leg 16. The second straight level 102 may also be inserted into the second slot 20 by pushing thereof into an end of the second slot 20. FIG. 3 shows a front view of a right angle level holder 1 with a first straight level 100 and the second straight level 102 retained thereby. The right angle level holder 1 may be used for measuring the level of outside corners, as well as inside corners.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A right angle level holder adapted for retaining two straight levels, comprising:

a right hand level base having a first leg and a second leg, each said leg having a slot disposed in thereof, said slot having a first side and a second side, an acute angle being formed at said first side, a raised portion being formed at a second side;

a plurality of fastener means being attached to said raised portion, said fastener means being manipulated to trap a straight level against said first side in each said slot.

2. The right angle level holder adapted for retaining two straight levels of claim 1, wherein:

each said fastener means being a thumb screw, said thumb screw being threaded into said raised portion of said right angle level base.

3. The right angle level holder adapted for retaining two straight levels of claim 2, further comprising:

said thumb screw having a first end and a second end, a thumb lever being disposed at said first end and a swivel tip being disposed at said second end, a substantially threaded body being disposed between said thumb lever and said swivel tip.

4. The beverage dispensing shut-off mechanism of claim 3, further comprising:

said swivel tip being swaged over a swivel knob at a second end of said thumb screw.

5. A right angle level holder adapted for retaining two straight levels, comprising:

a right hand level base having a first leg and a second leg, each said leg having a slot disposed on the outside surface thereof, said slot having a first side and a second side, an acute angle being formed at said first side, a raised portion being formed at a second side;

a plurality of fastener means being attached to said raised portion, said fastener means being manipulated to trap a straight level against said first side in each said slot.

6. The right angle level holder adapted for retaining two straight levels of claim 5, wherein:

each said fastener means being a thumb screw, said thumb screw being threaded into said raised portion of said right angle level base.

7. The right angle level holder adapted for retaining two straight levels of claim 6, further comprising:

said thumb screw having a first end and a second end, a thumb lever being disposed at said first end and a swivel tip being disposed at said second end, a substantially threaded body being disposed between said thumb lever and said swivel tip.

8. The beverage dispensing shut-off mechanism of claim 7, further comprising:

said swivel tip being swaged over a swivel knob at a second end of said thumb screw.

9. A right angle level holder adapted for retaining two straight levels, comprising:

a right hand level base having a first leg and a second leg, each said leg having a slot disposed on the outside surface thereof, said slot having a first side and a second side, an acute angle being formed at said first side, a raised portion being formed at a second side;

a plurality of thumb screws with a swivel tip being threaded into said raised portion, said thumb screw being rotated while the swivel tip is restrained from movement to trap a straight level against said first side in each slot.

10. The right angle level holder adapted for retaining two straight levels of claim 9, further comprising:

said thumb screw having a first end and a second end, a thumb lever being disposed at said first end and a swivel knob being disposed at said second end, a substantially threaded body being disposed between said thumb lever and said swivel knob, said swivel tip being swaged over said swivel knob such that said swivel tip freely rotates.

* * * * *